May 7, 1957 S. ÖBERG 2,791,767
NAVIGATIONAL RADAR REFLECTOR SYSTEMS
Original Filed April 13, 1951 3 Sheets-Sheet 2
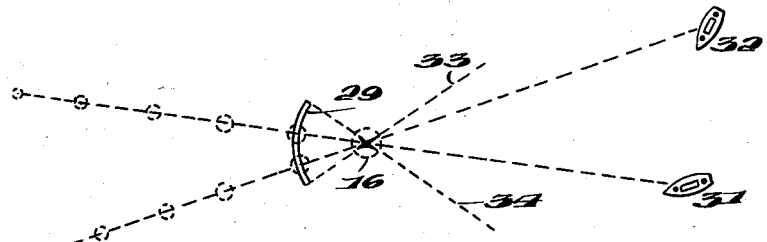
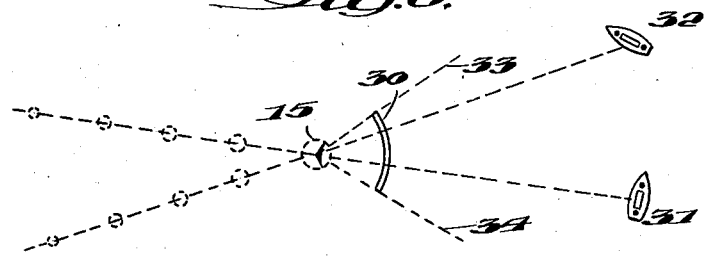
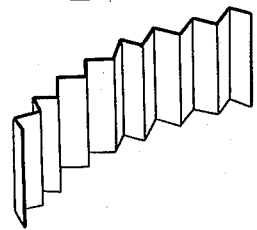 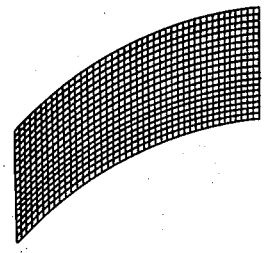
INVENTOR
SVEN OBERG,
BY Robert B. Pearson
ATTORNEY May 7, 1957  S. ÖBERG  2,791,767
NAVIGATIONAL RADAR REFLECTOR SYSTEMS
Original Filed April 13, 1951  3 Sheets-Sheet 3
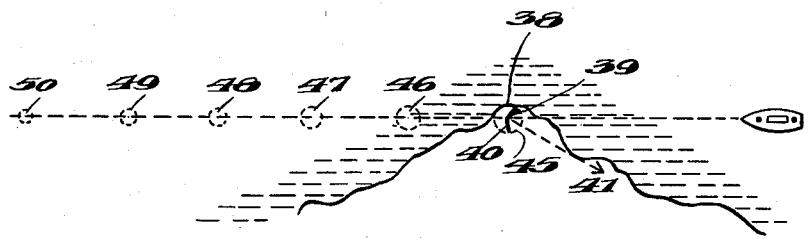
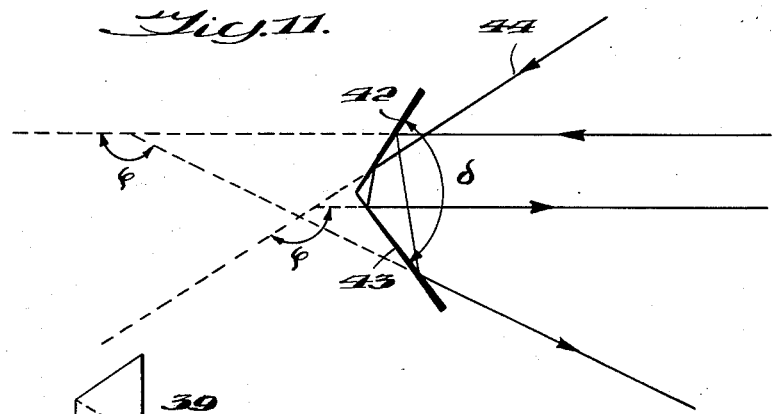
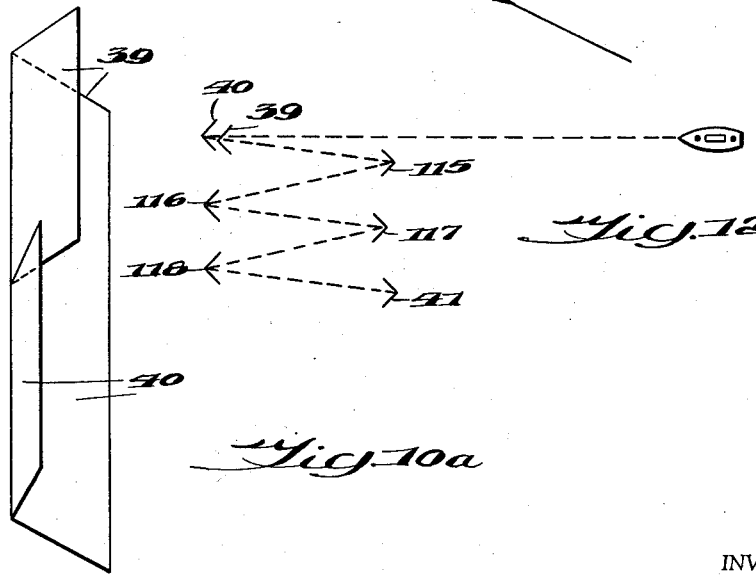
INVENTOR
SVEN OBERG,
BY
ATTORNEY United States Patent Office 2,791,767
Patented May 7, 1957

2,791,767

NAVIGATIONAL RADAR REFLECTOR SYSTEMS

Sven Öberg, Stockholm, Sweden, assignor to Svenska Aktiebolaget Gasaccumulator, Stockholm - Lidingo, Sweden, a company Original application April 13, 1951, Serial No. 220,757. Divided and this application October 11, 1954, Serial No. 461,584

5 Claims. (Cl. 343—18)

This application is a division of my co-pending application Serial No. 220,757, filed April 13, 1951.

This invention relates to navigation devices and more particularly to devices by which the position of objects can be located through the use of radar.

According to the broad principle of radar, a pulsed signal of a very high frequency is transmitted by a rotating antenna so as to scan the area adjacent the transmitter. Objects in the area will reflect the signal back to the transmitter to give an indication of the presence of the object. The reflected beam is directed to a cathode ray oscilloscope whose electron beam is constantly sweeping the scope in synchronism with the movement of the antenna. The intensity of the electron beam is influenced by the reflected radar wave, so that, for example, the electron beam is fully or partly suppressed when no reflected beam is received but obtains full intensity when a reflected beam is received.

Thus, the oscilloscope will indicate the position of the objects causing the reflection of the input of the radar beam.

The angular position on the screen will be determined by the angular position of the transmitter antenna. The indication on the screen of the distance of the object from the transmitter will be dependent upon the time required for the signal to be transmitted to the object and then reflected back to the transmitter.

The principles outlined above have been utilized as navigational aids for airplanes, ships and the like. One arrangement proposed involves the use of so-called radar reflectors. Such a reflector in its simplest form may consist of a metal disk for reflecting a radar beam as described above. As a rule the disk is not completely satisfactory because only in exceptional cases will it reflect a beam back to the transmitter. A better solution of the reflector problem is obtained by arranging two reflector plates at an angle to each other, and one of the best solutions consists in the arrangement of three reflector plates built together as a pyramid. These reflectors will function in the same way as the total reflecting pyramid known in the optical art.

These reflector arrangements, however, have the disadvantages that they will cause only a single point to be known in the optical art.

These reflector arrangements, however, have the disadvantages that they will cause only a single point to be received on the oscilloscope screen and the single point is difficult to separate and distinguish from other points inadvertently received on the screen. Nor has it been possible with such known arrangements for the operator to identify the particular reflector being observed.

It is the object of the present invention to provide a reflector arrangement by which the operator can easily distinguish the reflector being observed from random spots on the radar screen, and further to provide a code by which each reflector can be identified by the operator.

This and other objects are accomplished by a reflector system which operates entirely on signals reflected from objects constructed and arranged according to the present invention.

The invention is further described in connection with the attached drawings in which:

Figs. 1 and 2 indicate the general principle of the pyramidic radar reflector,

Figs. 5–7 are diagrammatic views of modifications of the arrangement of Fig. 3.

Figs. 8 and 9 are perspective views of reflectors which may be used in the arrangements of Figs. 5–7.

Fig. 10 is a diagrammatic view of a further modification of the arrangement of Fig. 3.

Figs. 10a and 11 are diagrammatic views illustrating the reflector to be used in the system of Fig. 10, and Fig. 12 is a diagrammatic view of still a further modification of the arrangement of Fig. 3.

Figure 1:
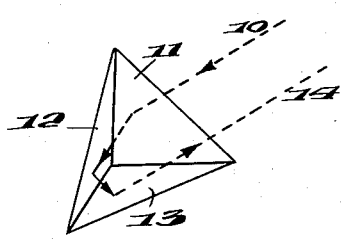

Fig. 1 shows a known radar reflector which operates according to the pyramidic principle. The reflector is constructed from three reflector screens 11, 12 and 13 connected together as sides of a pyramid with the angular relationship of the sides so designed that an input signal wave will always be reflected backwards in its own input direction. The angular relationships are known from the optical total reflecting pyramid. Thus, for instance, the beam 10 is first reflected against the side 11, thereafter against side 12 and finally against side 13. Thereafter, the beam returns in its own initial direction as beam 14.

Figure 2:
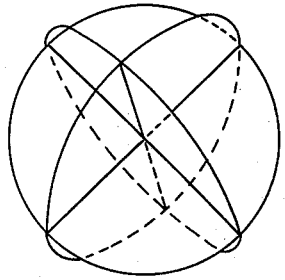

Fig. 2 shows an arrangement consisting in eight reflectors of the type shown in Fig. 1 mounted together to a spherical body. This arrangement has proved to be very effective even for marine navigation purposes in which the two vertically directed pyramid openings are not effective.

In the arrangement shown in Figs. 1 and 2, the input wave will be reflected back in the direction from which it originated regardless of its angle of approach to the reflector. When the wave comes in at an angle to all three sides, the reflection will take place from all three surfaces. On the other hand, if the input beam is parallel to one of the sides, only two reflections, from the remaining two sides, will be necessary to return the beam back to its source. Therefore, if it is known in advance that the input signal will always be in the horizontal direction, it will be necessary to construct the reflector of only two screens having their planes extending in the vertical direction. The invention will be described in connection with such a reflector although it is to be understood that the invention may be used equally well with the total reflecting pyramid. In order to simplify the description still further, the disclosure will deal primarily with the navigation of ships, although it is further to be understood that the invention may be applied equally well to the navigation of aircraft and the like.

In all of the embodiments shown and described, it will be assumed that the reflector is mounted on solid ground so that it may have a predetermined fixed position and that the radar beam from the vessel strikes the reflector horizontally. If these conditions cannot be satisfied, one skilled in the art can modify the arrangement to suit the particular need.

Figure 3:
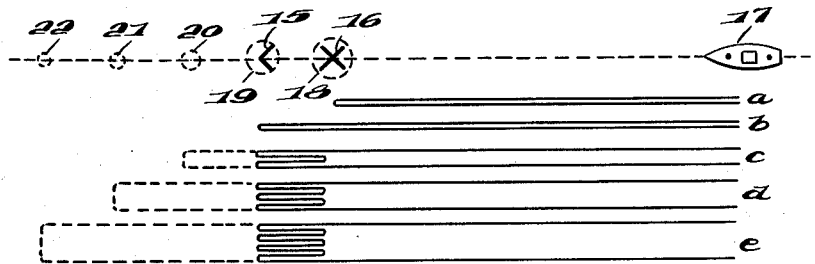
Fig. 3 is a diagrammatic view of a reflector arrangement illustrating the principle of the invention.

The principle of the invention is illustrated in Fig. 3. Two reflectors 15 and 16 are placed in fixed positions on two low rocks in an island group for example. The reflector 15 is a simple angular reflector consisting of two screens of the type referred to above. The reflector 16 is a combination of two such angular reflectors one directed toward reflector 15 and the other directed away from reflector 15. Further, reflector 16 is constructed so that a part of the radar beam will be reflected back to the source whereas the remaining part of the beam will pass beyond reflector 16 and will strike reflector 15.

It is assumed, for the purpose of describing this arrangement that a vessel 17 is transmitting a radar pulse which will be reflected by reflectors 15 and 16 back to the vessel so that the position of the reflectors can be indicated on the radar scope.

The transmitted pulse is first reflected directly back to the vessel by the half of reflector 16 facing the vessel 17. The returning beam will create a picture on the radar scope indicating the place 18 in Fig. 3. Diagrammatically, this pulse propagation has been indicated at $a$.

A part of the wave passes through reflector 16 and strikes reflector 15 and returns to the vessel giving an indication of the position 19. The pulse propagation is indicated diagrammatically at $b$.

The part of the wave energy reflected by reflector 15, however, will hit the half of reflector 16 facing away from the vessel so that it is again reflected to the reflector 15 and then back to the vessel. The wave propagation is indicated at $c$ but because of the longer propagation time the radar scope will appear to show a third position 20 indicating a propagation line illustrated by the dotted line at $c$. The indication is similar to the indication which would be obtained if a reflector had been placed at the position 20.

In this way, by repeated reflection or "imaging" a series of virtual reflector pictures are created on the radar scope. Two further such virtual reflector images have been indicated at 21 and 22 in Fig. 3 with the propagation diagrams at $d$ and $e$, respectively.

Due to the loss of energy in the reflections, the virtual reflector images will be weaker as they are more remote in order until finally no more virtual images are visible. However, enough virtual images will appear so as to form a limited band of dots by which the position of reflector 16, for example, can very easily be determined and distinguished from random reflections which may appear on the radar scope.

Figure 4A:
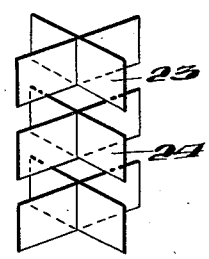
Figs. 4a and 4b are diagrammatic perspective views of reflectors which may be used in the arrangement of Fig. 3.
Figure 4B:
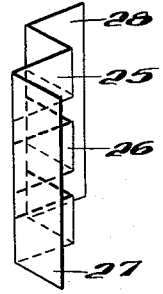

As indicated above, it is important that reflector 16 does not fully shadow reflector 15 for then reflector 15 would be ineffective. Suitable reflector constructions which may be used for this purpose are shown in Figs. 4a and 4b. In the embodiment shown in Fig. 4a the reflector is formed by screens which are arranged in the form of an X and located in laminae vertically above each other. In the embodiment according to Fig. 4b the screens are arranged in the form of a W and positioned vertically with respect to each other. In both cases spaces are left between each X-formed or W-formed reflector so as to permit part of the transmitted beam to pass through the reflector.

Theoretically, it would appear that if the input beam were completely horizontal, no repeated reflections would take place since the wave passing through the space between two reflector laminae would be reflected by reflector 15 in such a direction that it would again pass out through the same space without striking the reverse side of reflector 16. However, this does not occur in reality because, upon passing the reflector 16, the wave disperses or deviates to give the wave a slightly vertical component. Further, some spreading of the radiation is obtained at the reflection in each reflector and thus also in reflector 15. This dispersion and spreading have in practical tests proved to be fully sufficient for providing the repeated virtual reflection images.

The reflector according to Fig. 4b is constructed so as to be a single unit by joining the outer ends of the laminae such as 25 and 26 by plates 27 and 28. This arrangement makes the reflector very easily transportable and further the construction is of such a kind that a plurality of reflectors may be laid directly upon each other so as to form a tight package which is advantageous during transportation.

In the embodiments shown in Figs. 4a and 4b the penetrability of the wave through reflector 16 is provided by leaving spaces between reflector and screens. Other arrangements may be provided, for instance by making the reflector of a wire network of suitable mesh width. It is also possible to form a combination of the solid reflector with the wire mesh reflector so as to resemble a reflector according to Figs. 4a or 4b.

The distance between the two reflectors 15 and 16 is also important. With a radar system of normal quality and with usual wave lengths, a dissolution of the images created in the receiver can be obtained by spacing the reflectors for moderate distances such as 50 to 100 metres. If the distance between the reflectors is made less than the critical distance for dissolution, it is obvious that the reproduced images of the real or virtual reflectors will combine themselves into a line. On the other hand, if the distance between reflectors is greater than the critical distance, the images will appear as distinct dots on the radar scope.

The system described above is basic, but as shown would have a rather limited range of use as far as the formation of a band of virtual images is concerned. The band of virtual images can only be obtained if the vessel 17 is placed within a very limited angle so that the beam will strike both reflectors 16 and 15. The system of Fig. 3, however, may be used as a navigation bearing for an approaching channel or similar bearing line if the indication must take place with a high degree of accuracy. There may be need for such indication of lines in connection with marking of navigation channels, indicating of the running of cables and so on.

Figs. 5, 6 and 7, however, show modifications of the arrangement of Fig. 3 in which a considerably wider reaction angle is obtained. This wider angle is obtained by the use of semi-cylindrical bow-formed reflectors either alone or in combination with angular reflectors.

In the modification shown in Fig. 5, the reflector 15 has been replaced by a semi-cylindrical reflector 29 in which reflector 16 is located at the central axis of the reflector 29. In Fig. 6 a similar semi-cylindrical reflector 30 has been provided in place of reflector 16 so that its center point will coincide with the axis of reflector 15. The particular arrangement to be used in the individual case is dependent upon what fixed indication point is desired. In Fig. 5 the fixed indication point will occur at reflector 16, as illustrated by the radar beams emanating from vessels 31 and 32.

It will be observed that a quite large reaction angle is permitted through the use of the semi-cylindrical reflector 29 or 30, the angle being indicated by the lines 33, 34 passing through the center of the circle and the edges of the semi-cylindrical reflectors.

The functions of these arrangements are obvious from the drawings and are similar to that described in connection with Fig. 3. The band of dots or virtual images created on the radar scope will indicate a prolongation of the bearing line between the vessel and the reflector system and thereby will serve as a highly effective navigational aid.

A further embodiment similar to those shown in Figs. 5 and 6 is illustrated in Fig. 7. In that embodiment, the reflectors 15 and 16 are both replaced by semi-cylindrical reflectors 35 and 36 having a common center point 37. The actual orientation point for the vessels such as 31 and 32 is actually the center point 37. This point, however, will not appear on the radar scope. The arrangement of Fig. 7 has the advantage that a very wide angle indicated by lines 33 and 34 can be obtained as compared with the arrangements of Figs. 5 and 6.

Figs. 8 and 9 show two types of semi-cylindrical reflectors which can be used in the systems of Figs. 5, 6 and 7. In the reflector according to Fig. 8, a large number of angular reflectors are connected together so that their connecting lines will follow a semi-cylindrical contour.

The reflector of Fig. 9 is constructed from a metal wire network and is advantageous in requiring a small consumption of material and in that it is light in weight, simple to produce and easy to transport.

The semi-cylindrical reflectors, however, may be of a continuous metal surface. This may be formed either of a full metal plate or a perforated metal plate, or of wood which has been plated with metal foil or sprayed with a metallic paint. Other similar constructions could be made without departing from the scope of this invention.

It is to be understood that in these arrangements the reflectors nearest the transmitting vessel (such as 30 or 36 in Figs. 6 and 7, respectively) must be constructed so as to let a part of the signal energy pass through to the reflector more remote from the vessel. It is, therefore, advisable to make the reflectors such as 30 and 36 of a suitably dimensioned wire mesh or with the laminar principle described in connection with Figs. 4a and 4b.

There are certain disadvantages to the arrangement shown in Figs. 5, 6 and 7. For example, it is always necessary that the reflector nearest the transmitting vessel shadow to a certain extent the reflector more remote from the transmitting vessel. The intensity of the reflector system will, therefore, suffer. Further, it is possible that the particular topography will not permit the positioning of reflectors as required in connection with Figs. 5, 6 and 7. For example, it may be necessary to indicate, by means of a reflector system, a small rock in the middle of the water where the reflector 15 is placed. If there is no solid ground on the place where the reflector 16 or 30 should be placed, the system of Figs. 5 through 7 cannot be used.

The arrangement of Fig. 10 is designed to improve the degree of reflection of the system and/or to make it possible to arrange the reflector system with regard to varying topographical conditions.

In the arrangement of Fig. 10, it will be assumed that it is desired to mark a dangerous portion of land which juts out into the water as indicated at 38 in Fig. 10. It will be seen that there is no possibility of locating a reflector at a point which would normally occur at 46. In this case, however, a reflector is located at 39 and a second reflector located at 41. The reflector 39 is illustrated in Fig. 10a and consists of a right angle reflector at the top and immediately below an obtuse or acute angle reflector 40. These reflectors cooperate with the reflector 41 which is of the right angle type.

The radar beam initially will strike the right angle portion of reflector 39 and be reflected back to the vessel giving an indication of the position of that reflector at 45. The beam will also strike the obtuse or acute angle reflector 40 and be reflected to the reflector 41, back to the reflector 40 and to the vessels. In this way, the virtual image 46 will be created.

Part of the beam sent back from the angular reflector 41, however, will not strike the wide angle reflector 40 but will strike the right angle portion of reflector 39. This beam will again be reflected in the direction of the reflector 41 and back to the reflector 40 and to the vessel. Thus, by repeated reflections between reflector 39 and 41 and ultimately the wide-angle reflector 40, a series of virtual images 47, 48, 49, 50 and so on will be created on the radar scope.

The operation of the wide-angle reflector 40 can be explained by reference to the schematic diagram in Fig. 11. The reflector is constructed of two reflecting screens 42 and 43. If an input beam has the direction 44, this will first be reflected against the screen 42 and then against screen 43, but because of the wide angle will not be returned in the direction from which it originated.

Rather, it will take a direction differing from the input direction by the angle $\phi$.

If the opening angle of the wide angle reflector is $\delta$ it is obvious that the relation between the angle $\phi$ and the angle $\delta$ will be:

$$\delta = 180° - \frac{\varphi}{2}$$

In the system according to Fig. 10, the right angle reflector 41 should, therefore, be placed in the horizontal plane in a direction from the reflectors 39, 40, which is separated from the direction of the input beam by an amount of 180° $-\phi$. If the reflector 41 is positioned as described above, then the input beam will be reflected from the wide angle reflector 40 to the reflector 41 and then back toward the reflector 39 or 40 along the original path.

The embodiment shown in Fig. 10 has a disadvantage similar to that attending the system shown in Fig. 3 in that the vessel must be within a very narrow angle in order to obtain proper reception of the series of virtual images. A wider angle is obtainable if the reflector 41 is replaced by a semi-cylindrical surface in a manner which has already been described in connection with Figs. 5 to 9. Of course, the reflectors 39 and 40 could also possibly be replaced by semi-cylindrical surfaces in a corresponding way, but the cases when this might be suitable due to the present navigation requirements would probably be rather few.

Fig. 12 illustrates a system which is valuable in circumstances where it is impossible to provide a sufficiently great distance between two reflectors. Under these circumstances, it is possible to divide the propagation wave between two reflectors located close together in a zig-zag path by means of a number of auxiliary reflectors as shown in Fig. 12. The arrangement of this figure is substantially the same as that shown in Fig. 10 except that it is not possible to mount reflector 41 as required by the embodiment of Fig. 10. In the system of Fig. 12, auxiliary reflectors 115, 116, 117 and 118 are disposed in the path between the reflectors 40 and 41 so that the path is turned into a zig-zag form.

In a general manner, while there has been disclosed in the above description, what is deemed to be the most practical and efficient embodiment of my invention, it should be well understood that the invention is not limited to such embodiment as there might be changes made in the arrangement, disposition and form of the parts without departing from the principle of the present invention as comprehended within the scope of the accompanying claims.

I claim:

1. A reflector system intended for radar purposes comprising, a first reflector including a wide angle portion for receiving a signal beam and reflecting a first portion of said beam back to its transmitter, a second reflector located at the side of said first reflector for receiving a second portion of said beam from said wide angle portion, said second reflector being positioned on a line displaced by an angle $\varphi$ from the direction of incidence in which the optimum response is desired and passing through said first reflector, $$180° - \frac{\varphi}{2}$$

being the opening angle of the wide angle portion, said wide angle portion and said second reflector having cooperating reflecting surfaces disposed in beam aligned relationship to cause diminishing portions of said second portion of said beam to be reflected back and forth, the remaining portions of said second portion beam directed back to the transmitter.

2. A reflector system according to claim 1, in which the path of repeated reflection is divided into a zigzag path by means of a plurality of cooperating surfaces on said first and second reflectors.

3. A reflector system according to claim 1, in which the reflector nearest the transmitter is semi-cylindrical.

4. A reflector system according to claim 1, in which the reflector more remote from the transmitter is semi-cylindrical.

5. A reflector system intended for radar purposes comprising, a first reflector for receiving a signal beam and reflecting a first portion of said beam back to its transmitter, a second reflector for receiving a second portion of said beam from said first reflector, at least one of said reflectors being a semi-cylindrical reflector, said reflectors having cooperating reflecting surfaces disposed in beam aligned relationship to cause diminishing portions of said second portion of said beam to be reflected back and forth, the remaining portions of said second portion being directed back to the transmitter, said semi-cylindrical reflector being foraminous.

No references cited.